United States Patent
Yamazaki

[11] Patent Number: 6,115,090
[45] Date of Patent: Sep. 5, 2000

[54] DISPLAY DEVICE

[75] Inventor: Shunpei Yamazaki, Tokyo, Japan

[73] Assignee: Semiconductor Energy Laboratory Co., Ltd., Kanagawa-ken, Japan

[21] Appl. No.: 09/045,697

[22] Filed: Mar. 23, 1998

[30] Foreign Application Priority Data

Mar. 26, 1997 [JP] Japan ................................. 9-092935

[51] Int. Cl.[7] .................... G02F 1/136; G02F 1/1333; H01L 29/04
[52] U.S. Cl. .................... 349/42; 349/138; 257/72
[58] Field of Search .................... 349/138, 20, 52, 349/72, 143, 42, 43; 257/59, 72

[56] References Cited

U.S. PATENT DOCUMENTS

| | | | |
|---|---|---|---|
| 4,254,426 | 3/1981 | Pankove | 257/646 |
| 4,650,922 | 3/1987 | McPherson | 174/52.4 |
| 4,722,913 | 2/1988 | Miller | 438/659 |
| 4,804,490 | 2/1989 | Pryor et al. | 438/796 |
| 4,845,533 | 7/1989 | Pryor et al. | 257/4 |
| 4,869,755 | 9/1989 | Huschka | 136/259 |
| 4,972,250 | 11/1990 | Omori et al. | 257/631 |
| 5,117,299 | 5/1992 | Kondo et al. | 349/52 |
| 5,250,451 | 10/1993 | Chouan | 438/161 |
| 5,330,616 | 7/1994 | Yamazaki | 216/37 |
| 5,422,658 | 6/1995 | Kawaguchi et al. | 345/213 |
| 5,572,046 | 11/1996 | Takemura | 257/59 |
| 5,583,369 | 12/1996 | Yamazaki et al. | 257/635 |
| 5,696,386 | 12/1997 | Yamazaki | 257/57 |
| 5,712,495 | 1/1998 | Suzawa | 257/59 |
| 5,717,224 | 2/1998 | Zhang | 349/43 |
| 5,748,165 | 5/1998 | Kubota et al. | 345/96 |
| 5,815,231 | 9/1998 | Nishi et al. | 349/151 |
| 5,851,862 | 12/1998 | Ohtani et al. | 438/487 |

FOREIGN PATENT DOCUMENTS

| | | |
|---|---|---|
| 0221531 | 5/1987 | European Pat. Off. . |
| 55-107270 | 8/1980 | Japan . |
| 58-145134 | 8/1983 | Japan . |
| 60-145375 | 7/1985 | Japan . |
| 61-204933 | 9/1986 | Japan . |
| 61-244068 | 10/1986 | Japan . |
| 63-015461 | 1/1988 | Japan . |
| 5-002187 | 1/1993 | Japan . |

OTHER PUBLICATIONS

R.C.A. Review, vol. 43, No. 4, Dec. 1982, pp. 665–674, J. Zelez, "A Diamond–Like Carbon Film".

Primary Examiner—William L. Sikes
Assistant Examiner—Dung Nguyen
Attorney, Agent, or Firm—Eric J. Robinson; Nixon Peabody LLP

[57] ABSTRACT

There is disclosed a structure for radiating heat generated by TFTs in a liquid crystal panel. A DLC film 125 is provided on a resin interlayer film 123 disposed on the TFTs 105, 109, and 113. The DLC film 125 can be easily formed on the resin film, and has high heat conductivity, so that the film can be made to function as a heat radiating layer.

127 Claims, 3 Drawing Sheets

DISPLAY DEVICE

BACKGROUND OF THE INVENTION

1. Field of the Invention

The present invention relates to the structure of a reflection type liquid crystal display device.

2. Description of the Related Art

A reflection type liquid crystal panel has been known. Also, in an active matrix type liquid crystal panel, there is known a structure in which a peripheral driving circuit is integrated on the same substrate as an active matrix circuit. This structure is known as a peripheral driving circuit integration type.

In a peripheral driving circuit integration type liquid crystal panel, as a result that high picture quality is pursued, a peripheral driving circuit is required to operate at such a high speed as several tens MHz or more.

However, high speed operation causes a problem of heat generation from a device. Especially, since a liquid crystal panel uses a glass substrate or a quartz substrate, the panel has a problem that there is no escape for heat generated by a device (the thermal conductivity of quartz is 1/100 or less than that of single crystal silicon).

Also, a reflection type liquid crystal display panel is easy to secure a required aperture factor even if it is miniaturized. Accordingly, it has been considered to use the display panel for a projection type display.

However, since a liquid crystal panel for a projector is miniaturized (about 3 inches or less in diagonal), the above described problem of heat generation (heat generation from a peripheral driving circuit) especially becomes important.

Specifically, the peripheral driving circuit has such problems that the device characteristic is changed or deteriorated, or the device itself is broken by the heat generated by the circuit itself.

SUMMARY OF THE INVENTION

An object of the present invention is therefore to provide a structure of a display device capable of solving this sort of problem.

According to one aspect of the present invention, a display device is comprised of a pixel matrix portion; a peripheral driving circuit portion disposed on the same substrate as the pixel matrix portion; a thin film transistor disposed in each of the pixel matrix portion and the peripheral driving circuit portion; an interlayer insulating film made of resin material and disposed over the thin film transistor; and a carbon film disposed on the interlayer insulating film.

According to another aspect of the present invention, a display device is comprised of a pixel matrix portion; a peripheral driving circuit portion disposed on the same substrate as the pixel matrix portion; a thin film transistor disposed in each of the pixel matrix portion and the peripheral driving circuit portion, an interlayer insulating film made of resin material and disposed over the thin film transistor; and a carbon film as a heat releasing layer disposed on the interlayer insulating film.

It is preferable to use a DLC (Diamond-like Carbon) film as the carbon film. The DLC film is a carbon film comprising amorphous carbon having $SP^3$ bonds.

DETAILED DESCRIPTION OF THE INVENTION

Figure 1:
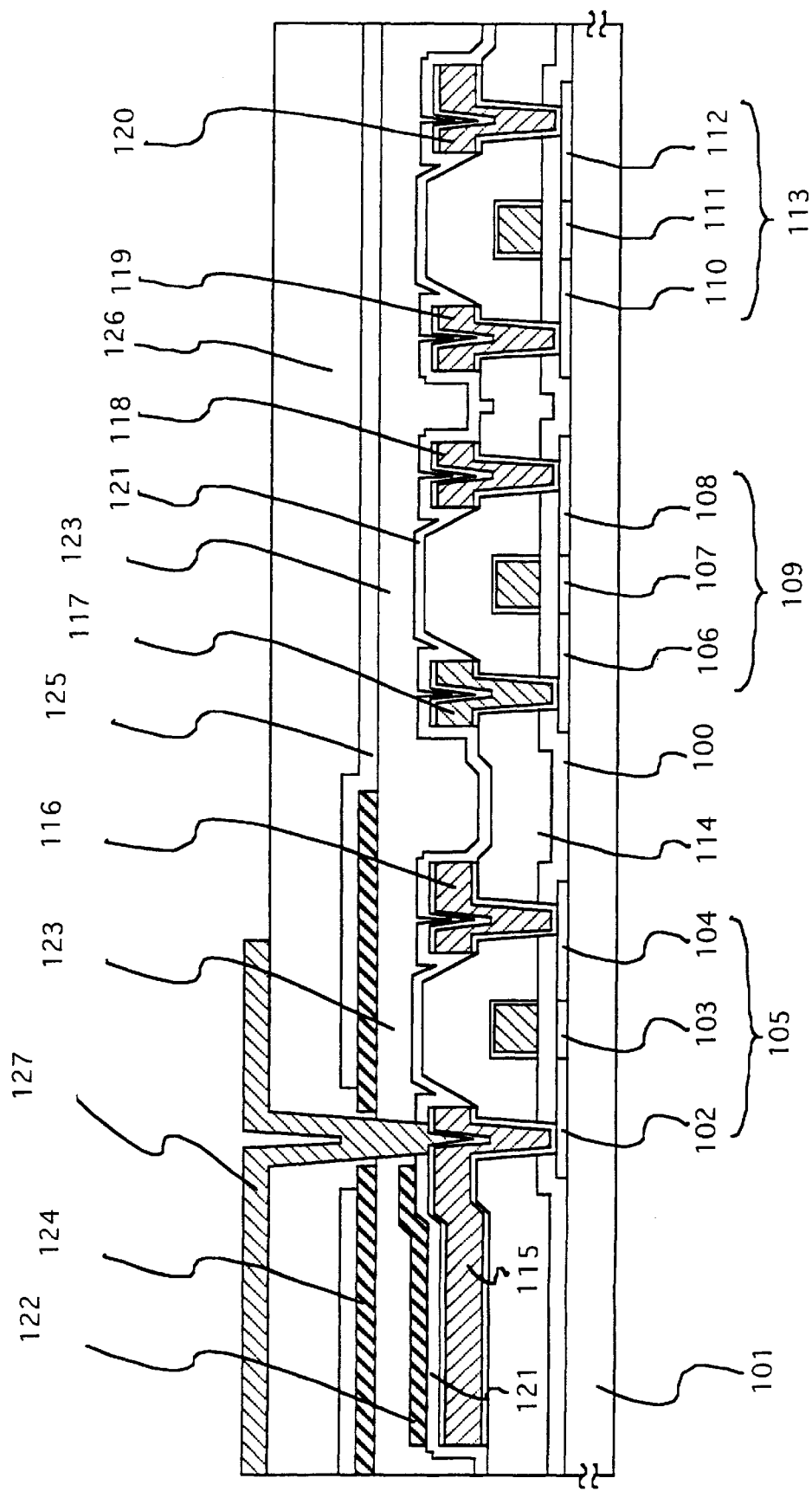
FIG. 1 is a view showing a cross section of a liquid crystal panel.

According to the present invention, as shown in FIG. 1, a DLC film 125 is provided on an interlayer insulating film 123 and a shielding titanium film 124. The DLC film effectively releases heat generated by a pixel TFT 105, and TFTs 109, 113 constituting a peripheral driving circuit.

[Embodiment 1]

FIG. 1 schematically shows a cross section of a reflection type liquid crystal panel using the present invention. In the drawing, reference numeral 101 denotes a glass substrate. A quartz substrate may be used instead of the glass substrate.

An NTFT 105 (N-channel thin film transistor, also called a pixel TFT) disposed in an active matrix circuit, and a PTFT 109 and an NTFT 113 constituting a peripheral driving circuit are disposed on the glass substrate 101.

A drain region 102, a channel region 103, and a source region 104 are formed in the NTFT 105.

A source region 106, a channel region 107, and a drain region 108 are formed in the PTFT 109.

A source region 112, a channel region 111, and a drain region 110 are formed in the NTFT 113.

The thickness of an active layer of the respective TFTs is made 50 nm. A silicon oxide film with a thickness of 100 nm as a common gate insulating film is provided in the respective TFTs.

The respective TFTs are covered with a silicon oxide film 114 with a thickness of 700 nm as an interlayer insulating film.

A source wiring line 116 brought into contact with the source region 104 of the NTFT 105, and a drain electrode 115 brought into contact with the drain region of the NTFT 105, each made of an aluminum film with a thickness of 500 nm, are disposed on the interlayer insulating film 114.

Also, a source electrode 117 brought into contact with the source region 106 of the PTFT 109 constituting the peripheral driving circuit, and a drain electrode 118 brought into contact with the drain region 108 of the PTFT 109 are disposed.

Also, a source electrode 120 brought into contact with the source region 112 of the NTFT 113 constituting the peripheral driving circuit, a drain electrode 119 brought into contact with the drain region 110 of the NTFT 113 are disposed.

A titanium film with a thickness of 100 nm is formed over and under the electrodes and wiring lines designated by 115, 116, 117, 118, 119, and 120. This film is necessary so as to have an excellent contact.

A silicon nitride film 121 with a thickness of 50 nm is formed to cover the electrodes and wiring lines designated by 115, 116, 117, 118, 119, and 120.

Further, a pattern 122 made of a titanium film is formed. A capacitance is formed by the pattern 122 made of the titanium film and the drain electrode 115 through the silicon nitride film 121.

Reference numeral 123 denotes a polyimide resin film with a thickness of 800 nm. This resin film is provided to absorb roughness formed by the existence of the TFTs, the electrodes, and the wiring lines so that a flattened surface is produced.

Resin material such as polyimide amide, polyamide, acryl, and epoxy may be used other than polyimide.

An electromagnetic shielding pattern 124 made of a titanium film with a thickness of 100 nm is disposed on the interlayer insulating film 123. This electromagnetic shielding pattern is disposed so that a reflecting pixel electrode 127 does not interfere with the source wiring line and the TFT.

A DLC (Diamond-like Carbon) 125 with a thickness of 1000 nm is formed.

Figure 2:
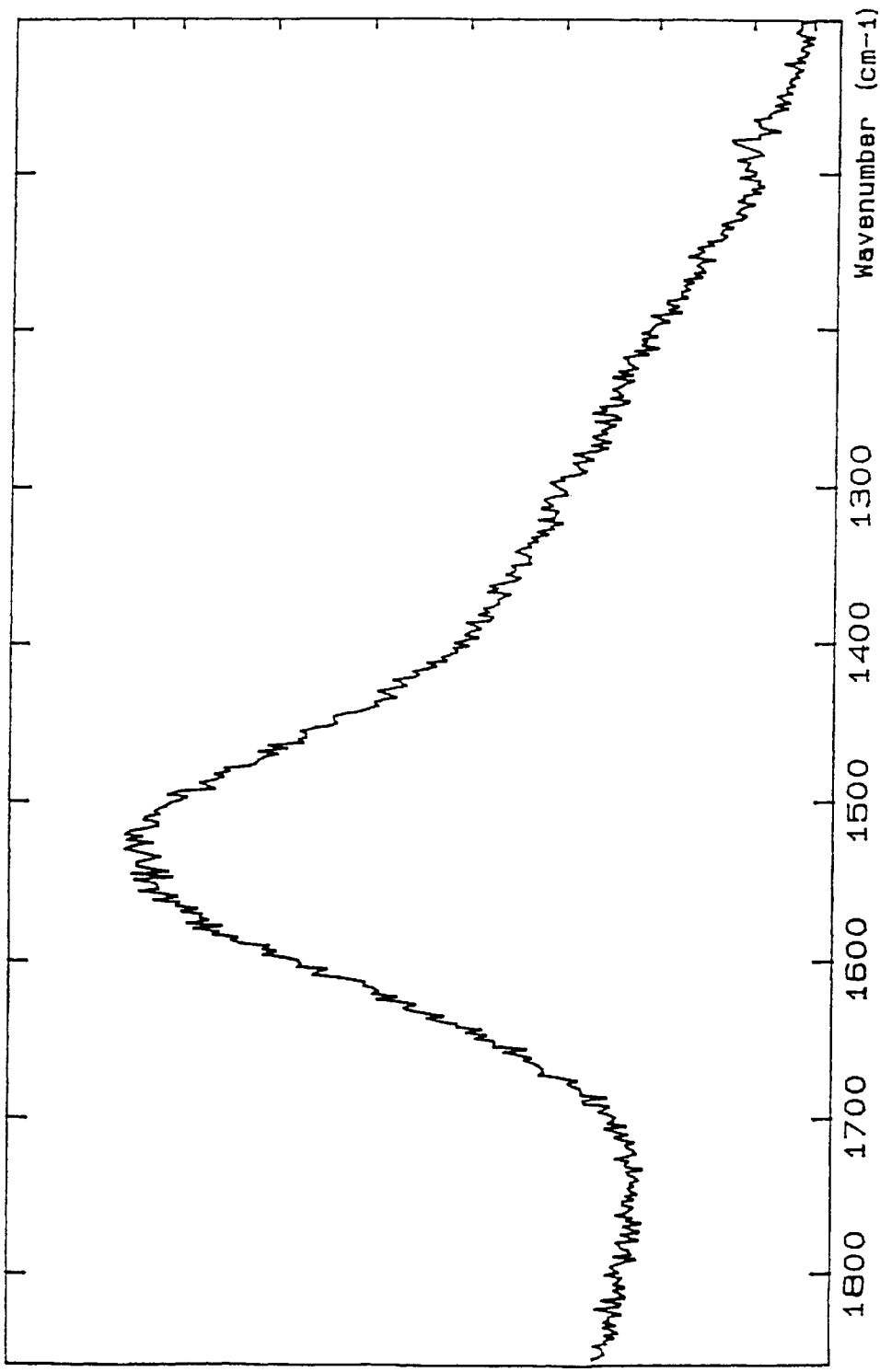
FIG. 2 is a view showing the Raman spectrum of a DLC film.

As the DLC film, it is preferable to use a film which exhibits the Raman spectrum as shown in FIG. 2.

Since the DLC film can be easily formed on the resin material, and has high heat conductivity, the DLC film effectively functions as a heat sink especially for diffusing heat generated by the TFTs of the peripheral driving circuit.

In a reflection type liquid crystal panel, there is no problem even if the DLC film extends to a pixel matrix portion. The adoption of such a structure enables the film to deal with heat generation from not only the peripheral driving circuit but also the pixel matrix portion.

Incidentally, although an AIN film and a diamond film other than the DLC film may be exemplified as a thin film that can be used as a heat sink, the DLC film can be most easily formed on a resin material.

A polyimide resin film 126 with an average thickness of 1 μm as an interlayer insulating film is formed on the DLC film, and further the reflecting pixel electrode 127 having a thickness of 400 nm and made of aluminum, is provided.

In this embodiment, although a top-gate type TFT is shown, a bottom-gate type TFT may be adopted.

[Embodiment 2]

In this embodiment, examples of display devices using the reflection type liquid crystal panel obtained by using the present invention will be described.

Figure 3A:
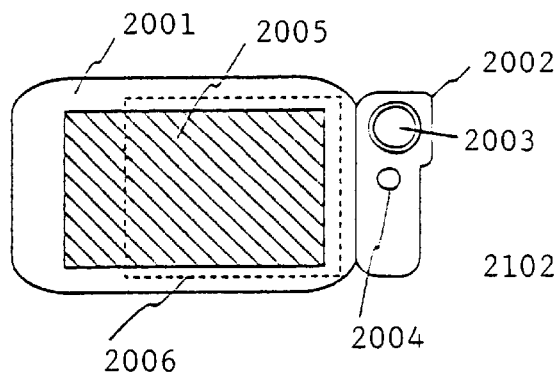
FIGS. 3A to 3F are views schematically showing devices using the present invention.

FIG. 3A shows a portable information processing terminal, which has a communication function using telephone lines.

This device includes an integrated circuit 2006 in the inside of a main body 2001. Further, this device includes a reflection type active matrix liquid crystal panel 2005 in which TFTs as switching elements are disposed, a camera portion 2002 for incorporating a picture image, and an operation switch 2004.

Figure 3B:
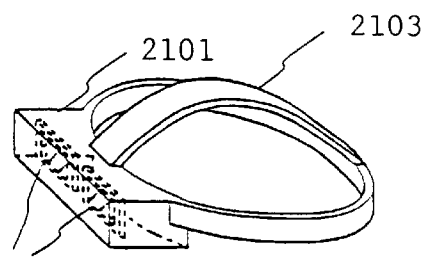

FIG. 3B shows an electric device called a head mount display. This device has a function to display a false picture image in front of eyes when a main body 2101 is mounted on a head through a band 2103. The picture image is formed by active matrix type liquid crystal panels 2102 corresponding to right and left eyes.

Figure 3C:
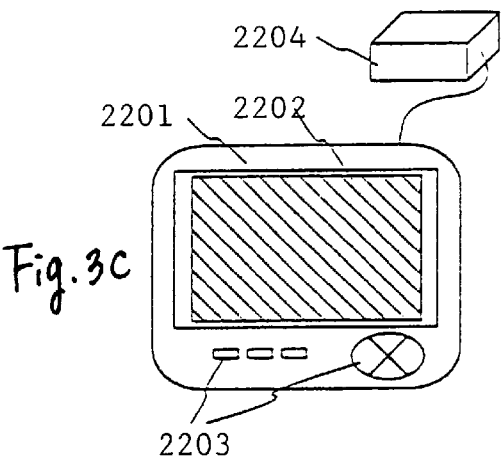

FIG. 3C shows an electric device having a function to display map information and various kinds of information based on signals from an artificial satellite. Information from an artificial satellite is received by an antenna 2204, and is processed by an electric circuit provided in the inside of a main body 2201, and necessary information is displayed on an active matrix type reflection type liquid crystal panel 2202.

The operation of the device is carried out by an operation switch 2203. Even in such a device, a circuit using TFTs is used.

Figure 3D:
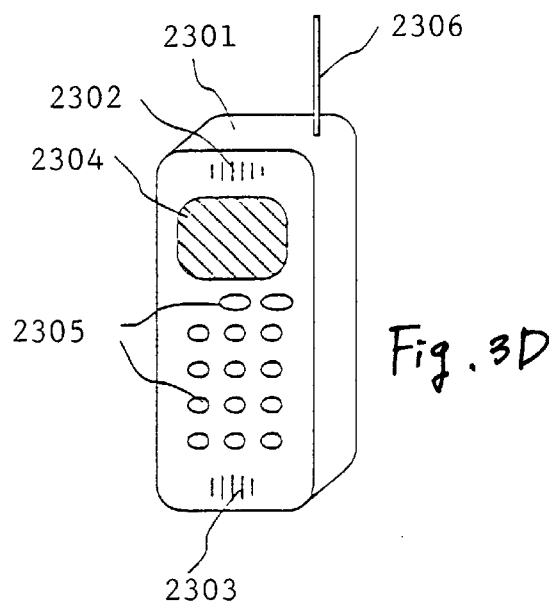

FIG. 3D shows a portable telephone. This electric device includes a main body 2301, an antenna 2306, an audio output portion 2302, a liquid crystal panel 2304, an operation switch 2305, and an audio input portion 2303.

Figure 3E:
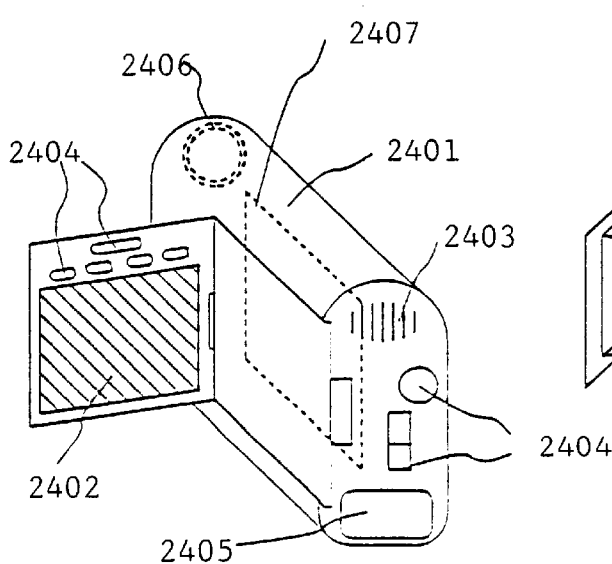

FIG. 3E shows a portable imaging device called a video camera. This device includes a reflection type liquid crystal panel 2402 attached to a close-open member of a main body 2401, and an operation switch 2404 attached to the close-open member.

Further, the main body 2401 is provided with an image receiving portion 2406, an integrated circuit 2407, an audio input portion 2403, an operation switch 2404, and a battery 2405.

Figure 3F:
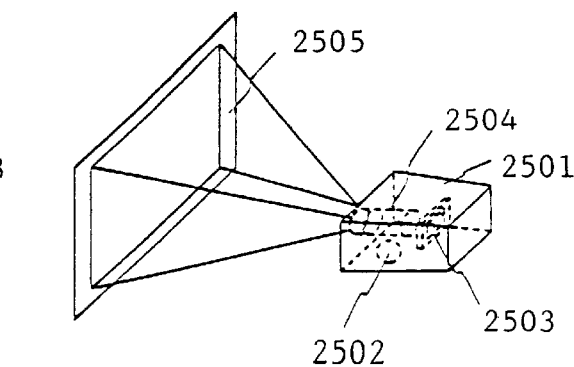

FIG. 3F shows a projection type liquid crystal display device. This device includes a main body 2501 provided with a light source 2502, a reflection type liquid crystal panel 2503, and an optical system 2504, and has a function to project a picture image onto a screen 2505.

It should be noted that the present invention can also be used for a flat panel display other than the case of using a liquid crystal. For example, in an EL display, the present invention can be used when an under layer of a light emitting layer is flattened. The present invention can also be used for an EC display and the like.

That is, the present invention can be used for realizing the structure in which a surface over a pixel region is desired to be flat.

As described above, by using the present invention, it is possible to provide a structure in which heat generated by a peripheral driving circuit can be effectively radiated. Also it is possible to provide a structure in which heat generated in the inside of a liquid crystal panel can be effectively radiated.

What is claimed is:

1. A projector device comprising:
a substrate having an insulating surface;
a pixel circuit formed over said substrate:
a driving circuit for driving said pixel circuit, each of said pixel circuit and said driving circuit comprising thin film transistors formed on said insulating surface;
a first interlayer insulating film comprising an organic material formed over said pixel circuit and said driving circuit;
a carbon film formed on said first interlayer insulating film;
a second interlayer insulating film formed on the carbon film.

2. A device according to claim 1 wherein said carbon film is a diamond-like carbon film.

3. A device according to claim 1 wherein said substrate comprises an insulating material.

4. A device according to claim 1 further comprising pixel electrodes formed on said carbon film.

5. A device according to claim 4 wherein said pixel electrodes are reflective.

6. A device according to claim 1 wherein said carbon film comprises amorphous carbon having $SP^3$ bonds.

7. A device according to claim 1 wherein said thin film transistors are of a top-gate type.

8. A device according to claim 1 wherein said thin film transistors are of a bottom-gate type.

9. A device according to claim 1 wherein the device is an EL device.

10. A display device comprising:
a substrate having an insulating surface;
an active matrix circuit formed over said substrate;
a driving circuit for driving said active matrix circuit, each of said active matrix circuit and said driving circuit comprising thin film transistors formed on said insulating surface;

a first interlayer insulating film comprising an organic material formed over the thin film transistors of said active matrix circuit and said driving circuit;

a carbon film formed on said interlayer insulating film; and a second interlayer insulating film formed on said carbon film.

11. A display device according to claim 10 wherein said carbon film is a diamond-like carbon film.

12. A display device according to claim 10 wherein said substrate comprises an insulating material.

13. A display device according to claim 10 further comprising pixel electrodes formed on said carbon film.

14. A display device according to claim 13 wherein said pixel electrodes are reflective.

15. A display device according to claim 10 wherein said display device is a projector.

16. A display device according to claim 10 wherein said carbon film comprises amorphous carbon having $SP^3$ bonds.

17. A device according to claim 10 wherein said thin film transistors are of a top-gate type.

18. A device according to claim 10 wherein said thin film transistors are of a bottom-gate type.

19. A device according to claim 10 wherein the display device is an EL display device.

20. A device having at least one active matrix panel said active matrix panel comprising:

a substrate having an insulating surface;

an active matrix circuit comprising at least one first thin film transistor formed over said substrate;

a driving circuit formed over said substrate and comprising at least an N-channel type thin film transistor and a P-channel type thin film transistor for driving said active matrix circuit;

a first interlayer insulating film comprising a first organic resin formed over the first thin film transistor and said N-channel type and P-channel type thin film transistors;

a carbon film formed over said first interlayer insulating film wherein said carbon film covers at least said first thin film transistor, said N-channel type thin film transistor and said P-channel type thin film transistor;

a pixel electrode formed over said carbon film and electrically connected to the first thin film transistor;

second interlayer insulating film comprising a second organic resin between said carbon film and said pixel electrode.

21. A device according to claim 20 wherein said carbon film is a diamond-like carbon film.

22. A device according to claim 20 wherein said substrate is a glass substrate.

23. A device according to claim 20 wherein said carbon film comprises amorphous carbon having $SP^3$ bonds.

24. A device according to claim 20 wherein the first thin film transistors are of an N-channel type.

25. A device according to claim 20 wherein each of said first thin film transistor and said N-channel type and P-channel type thin film transistors is of a top-gate type.

26. A device according to claim 20 wherein each of said first thin film transistor and said N-channel type and P-channel type thin film transistors is of a bottom-gate type.

27. A device according to claim 20 wherein said first organic resin comprises a material selected from the group consisting of polyimide, polyimide amide, polyamide, acryl, and epoxy.

28. A device according to claim 20 wherein said device is a portable information processing terminal, which comprises a main body, an integrated circuit in the main body, said active matrix panel, a camera portion for incorporating a picture image, and an operation switch.

29. A head mount display using the active matrix panel according to claim 20.

30. A device according to claim 20 further comprising an antenna wherein said active matrix panel displays a map information received by said antenna from an artificial satellite.

31. A device according to claim 20 wherein said device is a portable telephone, which comprises a main body, an antenna, an audio output portion, said active matrix panel, an operation switch, and an audio input portion.

32. A video camera having the active matrix panel according to claim 20.

33. A device according to claim 20 wherein said device is a projector having said active matrix panel, a light source, an optical system and a screen.

34. A device according to claim 20 wherein the device is an EL display device.

35. A device having at least one active matrix panel, said active matrix panel comprising:

a substrate having an insulating surface;

an active matrix circuit comprising at least one first thin film transistor formed over said substrate;

a driving circuit comprising at least an N-channel type thin film transistor and a P-channel type thin film transistor for driving said active matrix circuit;

a first interlayer insulating film comprising a first organic resin formed over the first thin film transistor and said N-channel type and P-channel type thin film transistors;

a carbon film formed over said first interlayer insulating film wherein said carbon film covers at least said first thin film transistor, said N-channel type thin film transistor and said P-channel type thin film transistor;

a reflective pixel electrode formed over said carbon film and electrically connected to the first thin film transistor;

a second interlayer insulating film comprising a second organic resin between said carbon film and said reflective pixel electrode.

36. A device according to claim 35 wherein said reflective pixel electrodes comprise aluminum.

37. A device according to claim 35 wherein said carbon film is a diamond-like carbon film.

38. A device according to claim 35 wherein said substrate is a glass substrate.

39. A device according to claim 35 wherein said carbon film comprises amorphous carbon having $SP^3$ bonds.

40. A device according to claim 35 wherein the first thin film transistors are of an N-channel type.

41. A device according to claim 35 wherein each of said first thin film transistor and said N-channel type and P-channel type thin film transistors is of a top-gate type.

42. A device according to claim 35 wherein each of said first thin film transistor and said N-channel type and P-channel type thin film transistors is of a bottom-gate type.

43. A device according to claim 35 wherein said first organic resin comprises a material selected from the group consisting of polyimide, polyimide amide, polyamide, acryl, and epoxy.

44. A device according to claim 35 wherein said device is a portable information processing terminal, which comprises a main body, an integrated circuit in the main body, said active matrix panel, a camera portion for incorporating a picture image, and an operation switch.

45. A head mount display using the active matrix panel according to claim 35.

46. A device according to claim 35 further comprising an antenna wherein said active matrix panel displays a map information received by said antenna from an artificial satellite.

47. A device according to claim 35 wherein said device is a portable telephone, which comprises a main body, an antenna, an audio output portion, said active matrix panel, an operation switch, and an audio input portion.

48. A video camera having the active matrix panel according to claim 35.

49. A device according to claim 33 wherein said device is a projector having said active matrix panel, a light source, an optical system and a screen.

50. A device according to claim 35 wherein the device is an EL display device.

51. A device having at least one active matrix panel, said active matrix panel comprising:
   a substrate having an insulating surface;
   an active matrix circuit comprising first thin film transistors formed over said substrate;
   a driving circuit comprising second thin film transistors for driving said active matrix circuit;
   a first interlayer insulating film comprising a first organic resin formed over the first and second thin film transistors;
   an electromagnetic shield pattern formed over said first interlayer insulating film;
   a carbon film formed over said first interlayer insulating film and said electromagnetic shield pattern;
   reflective pixel electrodes formed over said carbon film and electrically connected to the first thin film transistors;
   a second interlayer insulating film comprising a second organic resin between said carbon film and said reflective pixel electrodes.

52. A device according to claim 51 wherein said reflective pixel electrodes comprise aluminum.

53. A device according to claim 51 wherein said carbon film is a diamond-like carbon film.

54. A device according to claim 51 wherein said substrate is a glass substrate.

55. A device according to claim 51 wherein said carbon film comprises amorphous carbon having $SP^3$ bonds.

56. A device according to claim 51 wherein said electromagnetic shield functions so that said pixel electrodes do not interfere with said first thin film transistors.

57. A device according to claim 51 wherein each of said first and second thin film transistors is of a top-gate type.

58. A device according to claim 51 wherein each of said first and second thin film transistors is of a bottom-gate type.

59. A device according to claim 51 wherein said first organic resin comprises a material selected from the group consisting of polyimide, polyimide amide, polyamide, acryl, and epoxy.

60. A device according to claim 51 wherein said device is a portable information processing terminal, which comprises a main body, an integrated circuit in the main body, said active matrix panel, a camera portion for incorporating a picture image, and an operation switch.

61. A head mount display using the active matrix panel according to claim 48.

62. A device according to claim 51 further comprising an antenna wherein said active matrix panel displays a map information received by said antenna from an artificial satellite.

63. A device according to claim 51 wherein said device is a portable telephone, which comprises a main body, an antenna, an audio output portion, said active matrix panel, an operation switch, and an audio input portion.

64. A video camera having the active matrix panel according to claim 48.

65. A device according to claim 51 wherein said device is a projector having said active matrix panel, a light source, an optical system and a screen.

66. A device according to claim 51 wherein the device is an EL display device.

67. A device having at least one active matrix panel, said active matrix panel comprising:
   a substrate having an insulating surface;
   an active matrix circuit comprising first thin film transistors formed over said substrate;
   a driving circuit comprising second thin film transistors for driving said active matrix circuit;
   a first interlayer insulating film comprising a first organic resin formed over the first and second thin film transistors;
   an electromagnetic shield pattern formed over said first interlayer insulating film;
   a carbon film formed over said first interlayer insulating film and said electromagnetic shield pattern;
   pixel electrodes formed over said carbon film and electrically connected to the first thin film transistors;
   a second interlayer insulating film comprising a second organic resin between said carbon film and said pixel electrodes.

68. A device according to claim 67 wherein said electromagnetic shield functions so that said pixel electrodes do not interfere with said first thin film transistors.

69. A device according to claim 67 wherein said carbon film is a diamond-like carbon film.

70. A device according to claim 67 wherein said substrate is a glass substrate.

71. A device according to claim 67 wherein said carbon film comprises amorphous carbon having $SP^3$ bonds.

72. A device according to claim 67 wherein the first thin film transistors are of an N-channel type.

73. A device according to claim 67 wherein each of said first and second thin film transistors is of a top-gate type.

74. A device according to claim 67 wherein each of said first and second thin film transistors is of a bottom-gate type.

75. A device according to claim 67 wherein said first organic resin comprises a material selected from the group consisting of polyimide, polyimide amide, polyamide, acryl, and epoxy.

76. A device according to claim 67 wherein s aid device is a portable information processing terminal, which comprises a main body, an integrated circuit in the main body, said active matrix panel, a camera portion for incorporating a picture image, and an operation switch.

77. A head mount display using the active matrix panel according to claim 67.

78. A device according to claim 67 further comprising an antenna wherein said active matrix panel displays a map information received by said antenna from an artificial satellite.

79. A device according to claim 67 wherein said device is a portable telephone, which comprises a main body, an antenna, an audio output portion, said active matrix panel, an operation switch, and an audio input portion.

80. A video camera having the active matrix panel according to claim 67.

81. A device according to claim 67 wherein said device is a projector having said active matrix panel, a light source, an optical system and a screen.

82. A device according to claim 67 wherein the device is an EL display device.

83. A device having at least one active matrix panel, said active matrix panel comprising:
   a substrate having an insulating surface;
   an active matrix circuit comprising at least one first thin film transistor formed over said substrate;
   a driving circuit comprising at least one second thin film transistor for driving said active matrix circuit;
   a first interlayer insulating film formed over said first and second thin film transistors;
   a first electrode formed on said first interlayer insulating film and electrically connected to a drain of said first thin film transistor through a contact hole of said first interlayer insulating film;
   a second electrode formed on said first interlayer insulating film and electrically connected to one of a source or a drain of said second thin film transistor through a contact hole of said first interlayer insulating film wherein each of said first and second electrodes comprises a first layer comprising titanium, a second layer comprising aluminum and a third layer comprising titanium laminated in this order;
   a second interlayer insulating film comprising a first organic resin formed over the first and second thin film transistors;
   a third interlayer insulating film comprising carbon formed over said second interlayer insulating film wherein said third interlayer insulating film covers at least said first and second thin film transistors;
   a pixel electrode formed over said third interlayer insulating film and electrically connected to the first thin film transistor through said first electrode;
   a fourth interlayer insulating film comprising a second organic resin between said third interlayer insulating film and said pixel electrode.

84. A device according to claim 83 wherein said carbon film is a diamond-like carbon film.

85. A device according to claim 83 wherein said substrate is a glass substrate.

86. A device according to claim 83 wherein said carbon film comprises amorphous carbon having $SP^3$ bonds.

87. A device according to claim 83 wherein the first thin film transistors are of all N-channel type.

88. A device according to claim 83 wherein each of said first and second thin film transistors is of a top-gate type.

89. A device according to claim 83 wherein each of said first and second thin film transistors is of a bottom-gate type.

90. A device according to claim 83 wherein said first organic resin comprises a material selected from the group consisting of polyimide, polyimide amide., polyamide, acryl, and epoxy.

91. A device according to claim 83 wherein said device is a portable information processing terminal, which comprises a main body, an integrated circuit in the main body, said active matrix panel, a camera portion for incorporating a picture image, and an operation switch.

92. A head mount display using the active matrix panel according to claim 83.

93. A device according to claim 83 further comprising an antenna wherein said active matrix panel displays a map information received by said antenna from an artificial satellite.

94. A device according to claim 83 wherein said device is a portable telephone, which comprises a main body, an antenna, an audio output portion, said active matrix panel, an operation switch, and an audio input portion.

95. A video camera having the active matrix panel according to claim 83.

96. A device according to claim 83 wherein said device is a projector having said active matrix panel, a light source, an optical system and a screen.

97. A device according to claim 83 wherein the device is an EL display device.

98. A semiconductor device comprising:
   a substrate having an insulating surface;
   a semiconductor circuit formed over said substrate;
   a first interlayer insulating film comprising a first organic resin formed over the semiconductor circuit;
   a carbon film formed over said first interlayer insulating film;
   a second interlayer insulating film comprising a second organic resin over the carbon film.

99. A device according to claim 98 wherein said carbon film is a diamond-like carbon film.

100. A device according to claim 98 wherein said substrate is a glass substrate.

101. A device according to claim 98 wherein said carbon film comprises amorphous carbon having $SP^3$ bonds.

102. A device according to claim 98 wherein said first organic resin comprises a material selected from the group consisting of polyimide, polyimide amide, polyamide, acryl, and epoxy.

103. A device according to claim 98 wherein said device is a portable information processing terminal, which comprises a main body, an integrated circuit in the main body, said active matrix panel, a camera portion for incorporating a picture image, and an operation switch.

104. A head mount display using the active matrix panel according to claim 98.

105. A device according to claim 98 further comprising an antenna wherein said active matrix panel displays a map information received by said antenna from an artificial satellite.

106. A device according to claim 98 wherein said device is a portable telephone, which comprises a main body, an antenna, an audio output portion, said active matrix panel, an operation switch, and an audio input portion.

107. A video camera having the active matrix panel according to claim 98.

108. A device according to claim 98 wherein the semiconductor device is a projector having an active matrix panel, a light source, an optical system and a screen.

109. A device according to claim 98 wherein the device is an EL display device.

110. A device according to claim 92, further comprising:
   an active matrix circuit formed in the semiconductor circuit comprising first thin film transistors;
   a driving circuit formed in the semiconductor circuit comprising second thin film transistors for driving the active matrix circuit;
   an electromagnetic shield formed between the first interlayer insulating film and the carbon film:
   reflective pixel electrodes over the second interlayer insulating film.

111. A device according to claim 110 wherein said electromagnetic shield functions so that said reflective pixel electrodes do not interfere with said first thin film transistors.

112. A device according to claim 110 wherein the first thin film transistors are of an N-channel type.

113. A device according to claim 110 wherein each of said first and second thin film transistors is of a top-gate type.

114. A device according to claim 110 wherein each of said first and second thin film transistors is of a bottom-gate type.

115. A device according to claim 110 wherein said reflective pixel electrodes comprise aluminum.

116. A device having at least one active matrix panel, said active matrix panel comprising:

a substrate having an insulating surface;

an active matrix circuit comprising at least one first thin film transistor formed over said substrate;

a driving circuit comprising at least one second thin film transistor for driving said active matrix circuit;

a first interlayer insulating film formed over said first and second thin film transistors;

a first electrode formed on said first interlayer insulating film and electrically connected to a drain of said first thin film transistor through a contact hole of said first interlayer insulating film;

a second electrode formed on said first interlayer insulating film and electrically connected to one of a source or a drain of said second thin film transistor through a contact hole of said first interlayer insulating film;

a second interlayer insulating film comprising a first organic resin formed over the first and second thin film transistors;

a third interlayer insulating film comprising carbon formed over said second interlayer insulating film wherein said third interlayer insulating film covers at least said first and second thin film transistors;

a reflective pixel electrode formed over said third interlayer insulating film and electrically connected to the first thin film transistor through said first electrode;

a fourth interlayer insulating film comprising a second organic resin between said third interlayer insulating film and said reflective pixel electrode.

117. A device according to claim 116 wherein said carbon film is a diamond-like carbon film.

118. A device according to claim 116 wherein said substrate is a glass substrate.

119. A device according to claim 116 wherein said carbon film comprises amorphous carbon having $SP^3$ bonds.

120. A device according to claim 116 wherein said first organic resin comprises a material selected from the group consisting of polyimide, polyimide amide, polyamide, acryl, and epoxy.

121. A device according to claim 116 wherein said device is a portable information processing terminal, which comprises a main body, an integrated circuit in the main body, said active matrix panel, a camera portion for incorporating a picture image, and an operation switch.

122. A head mount display using the active matrix panel according to claim 116.

123. A device according to claim 116 further comprising an antenna wherein said active matrix panel displays a map information received by said antenna from an artificial satellite.

124. A device according to claim 116 wherein said device is a portable telephone, which comprises a main body, an antenna, an audio output portion, said active matrix panel, an operation switch, and an audio input portion.

125. A video camera having the active matrix panel according to claim 116.

126. A device according to claim 116 wherein said device is a projector having said active matrix panel, a light source, an optical system and a screen.

127. A device according to claim 116 wherein the device is an EL display device.

* * * * *